Sept. 10, 1940.  L. BUTLER  2,214,073
HAY SWEEP ATTACHMENT TO MOTOR VEHICLES AND THE LIKE
Filed Nov. 28, 1938
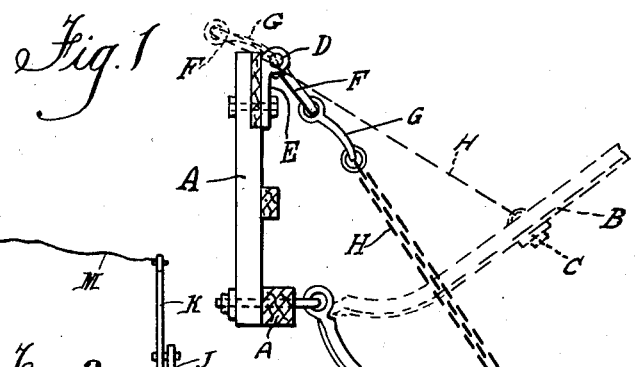
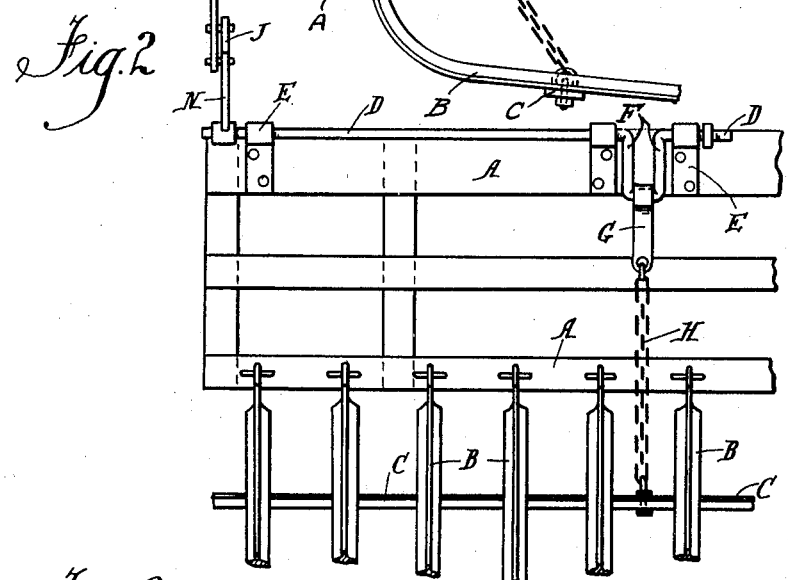
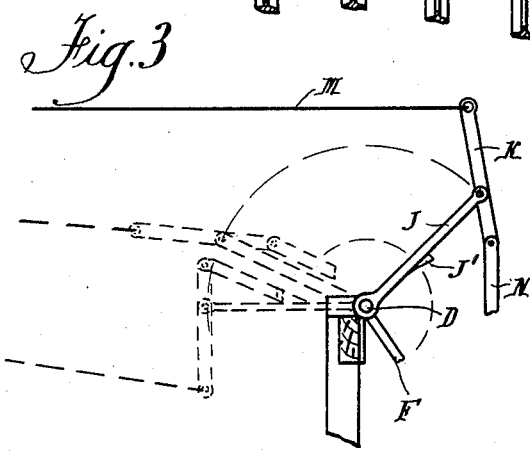
INVENTOR
LOUIS BUTLER
BY Young, Emery & Thompson
ATTYS.

Patented Sept. 10, 1940

2,214,073

UNITED STATES PATENT OFFICE 2,214,073

HAY SWEEP ATTACHMENT TO MOTOR VEHICLES AND THE LIKE

Louis Butler, Inglewood, New Zealand

Application November 28, 1938, Serial No. 242,839
In New Zealand December 2, 1937

2 Claims. (Cl. 56—27)

This invention relates to that class of hay sweep attachments to motor vehicles and the like, comprising a frame adapted to be secured across the front of a vehicle body so that it extends in a general vertical manner, and an assembly of parallel tines which are attached to the lower edge of such frame by pivotal means such that the assembly may be caused to extend forwardly in an approximately horizontal manner with the tine points resting on the ground, or may be swung up and back to rest vertically against the frame.

The object of the present invention is to provide improved means of simple and efficient nature for combination with such a form of hay sweep, whereby the whole tine assembly may be raised and lowered at will by operations carried out by the driver of the vehicle to which the sweep is attached, and without the driver having to leave his seat.

The invention comprises the combination with the said frame and tine assembly, of a spindle journalled to extend horizontally across the top of the frame and having a crank formed or secured thereto which is connected with the tine assembly to provide that by rotation of the spindle in one direction, the tine assembly will be lifted free of the ground and by rotation in the other direction, such assembly will be lowered into operative position. It also comprises means for attachment to the spindle whereby the said turning movements of the spindle may be effected by pulls exerted upon a rope or chain extending back to the vehicle in a position to be operated by the driver.

In fully explaining the invention, reference will be made to the accompanying sheet of drawings, in which:

Figure 1 is a side elevation of the sweep attachment, but with the operating means for the lifting spindle omitted.

Figure 2 is a front elevation of one half of the attachment, the operating means being also shown.

Figure 3 is a side elevation of the spindle operating means.

A is the vertical frame of the sweep attachment which is designed to be secured across the vehicle front in the manner described and illustrated in the specification and drawing of my United States Patent No. 1,773,446.

B are the tines pivotally attached at their rear ends to the bottom of the frame A so that they will extend forwardly and are capable of being raised and lowered at their forward ends to be put out of action or into action. These tines are connected by one or more cross bars C to make a single assembly thereof capable of being lifted or lowered together.

The lifting means embodied in this invention, comprise a spindle D that is mounted in bearings E upon the top edge of the said frame A to extend in from one end to about the middle of its length and which is formed with a cranked portion F at its inner end positioned at about the middle line of the tine assembly. This crank F has a link member G loosely journalled on it and such link is connected to the tine assembly at a point a distance out from its pivotal attachment to the frame, by means of a chain connection H, which may conveniently be fastened to the cross bar C on the said assembly. In some cases, the spindle may be carried right across the frame front and formed with a crank near each end and connections with the tine assembly to distribute the lifting action more evenly across the width of such assembly. In most cases, however, the single crank, as shown, is sufficient.

The rotation of this spindle D is designed, by raising the crank F, to lift the tine assembly to an elevated position and, by lowering the crank, to allow the assembly to drop to the ground. The crank and spindle, however, are so disposed upon the frame and relatively arranged that the crank is capable of being swung up and a short distance back over its highest point, as shown by the dotted lines in Figure 1, and then to engage a stop upon the frame or the top of the frame itself which will serve to support it and thus to lock the crank and tine assembly in the raised position automatically by reason of the weight then acting on it to draw the crank back against the stop. Then to lower the tine assembly, it only requires that the spindle should be turned enough to throw the crank forwardly beyond its highest point, when the weight of the tine assembly will allow of its dropping.

The means provided for turning the spindle in this manner by operation from the driver's seat, and as shown in Figures 2 and 3, are of such a nature as to provide that the spindle may be turned in the necessary direction to raise the tine assembly and also in the manner required to lower such assembly by a similar pull upon an operating rope or chain leading back to the vehicle. Such means comprise an arm J that is fastened to the spindle at any appropriate point in its length (in the drawing it is shown at the outer end) and extends radially therewith, and a two ended lever K pivoted on the extremity of such arm to swing in the plane of the arm's length. One end of this lever is made heavier than the other and has a pull rope M secured to it, while the other end has a pawl N pivoted upon it. A tooth J' is formed on one edge of the arm J, the edge being that which is underneath when the arm is swung forward, and is the upper edge when the arm is drawn rearward.

These means are so disposed relatively to the spindle and to each other that when the spindle is in the position to lower the crank F to drop the tine assembly, the arm J extends forwardly in the manner shown in Figure 3, with the lever K swinging loosely. Then when a rearward pull is exerted upon the rope M, the lever straightens in the line of the pull and as the pull is continued, swings the arm J back and over to raise the crank F and lift the tine assembly. As the lever is straightened with the pull the pawl N extends along on the edge of the arm having the tooth J' thereon, as indicated in the first position shown by the dotted lines in Figure 3. When the pull is completed and the arm is caused to turn right back to engage the frame top as the crank F swings down a little beyond the vertical, as previously explained, the strain on the rope is eased, thus allowing the weighted end of the lever to swing down to the vertical and causing the pawl N to be drawn back so that it drops behind the tooth J', as shown in the second of the dotted line positions in Figure 3. These parts will retain these positions while the tine assembly is kept raised, the general strain keeping the pawl in engagement with its tooth. When it is required to lower the tine assembly, the rope M is pulled rearwardly again and this causes a leverage action to be exerted upon the lower end of the lever K which as it is drawn rearwardly by reason of the lock effected by the pawl with the tooth J', will lift the arm J to a sufficient extent to cause the spindle to be turned enough to move the crank F forwardly over the top of its throw, when the weight of the tine assembly will cause it to fall to the lowered position.

I claim:

1. A hay sweep attachment for motor vehicles of the class wherein the attachment comprises a vertically disposed frame adapted to be affixed to the vehicle front, and an assembly of tines pivoted to the lower edge of the frame to extend forwardly, means for raising and lowering the tine assembly upon its pivots, consisting in a spindle mounted horizontally along the upper part of the said frame, a crank formed on such spindle, a link on the crank end, a flexible connection between the link and a point on the tine assembly a distance out from its pivots, means for turning the spindle for raising and lowering the crank, and a stop positioned on the said frame to engage the crank when it has been turned up and beyond its highest point, so that the tendency of the tines to move down will urge the crank against said stop.

2. A hay sweep attachment for motor vehicles of the class wherein the attachment comprises a vertically disposed frame adapted to be affixed to the vehicle front, and an assembly of tines pivoted to the lower edge of the frame to extend forwardly, means for raising and lowering the tine assembly upon its pivots, consisting in a spindle mounted horizontally along the upper part of the said frame, a crank formed on such spindle, a link on the crank end, a flexible connection between the link and a point on the tine assembly a distance out from its pivots, means for turning the spindle for raising and lowering the crank, and a stop positioned on the said frame to engage the crank when it has been turned up and beyond its highest point, so that the tendency of the tines to move down will urge the crank against said stop, means for actuating the crank spindle to raise and lower the crank, comprising an arm affixed to and extending radially from the spindle and having a tooth formed on one of its edges, a lever pivoted intermediate its ends on the end of such arm and having one end heavier than the other, a pawl pivoted on the lighter end of such lever and having one end engageable with said tooth when the arm is in substantially horizontal position with the tooth up and when the heavier end of the lever is in its lowermost position, and a pull rope attached to the heavier end thereof.

LOUIS BUTLER.